(No Model.)
D. RIGOLE.
PROCESS OF AND APPARATUS FOR THE EXTRACTION OF GUTTA PERCHA FROM THE LEAVES AND TWIGS OF THE GUTTA PERCHA TREE.
No. 495,757.          Patented Apr. 18, 1893.
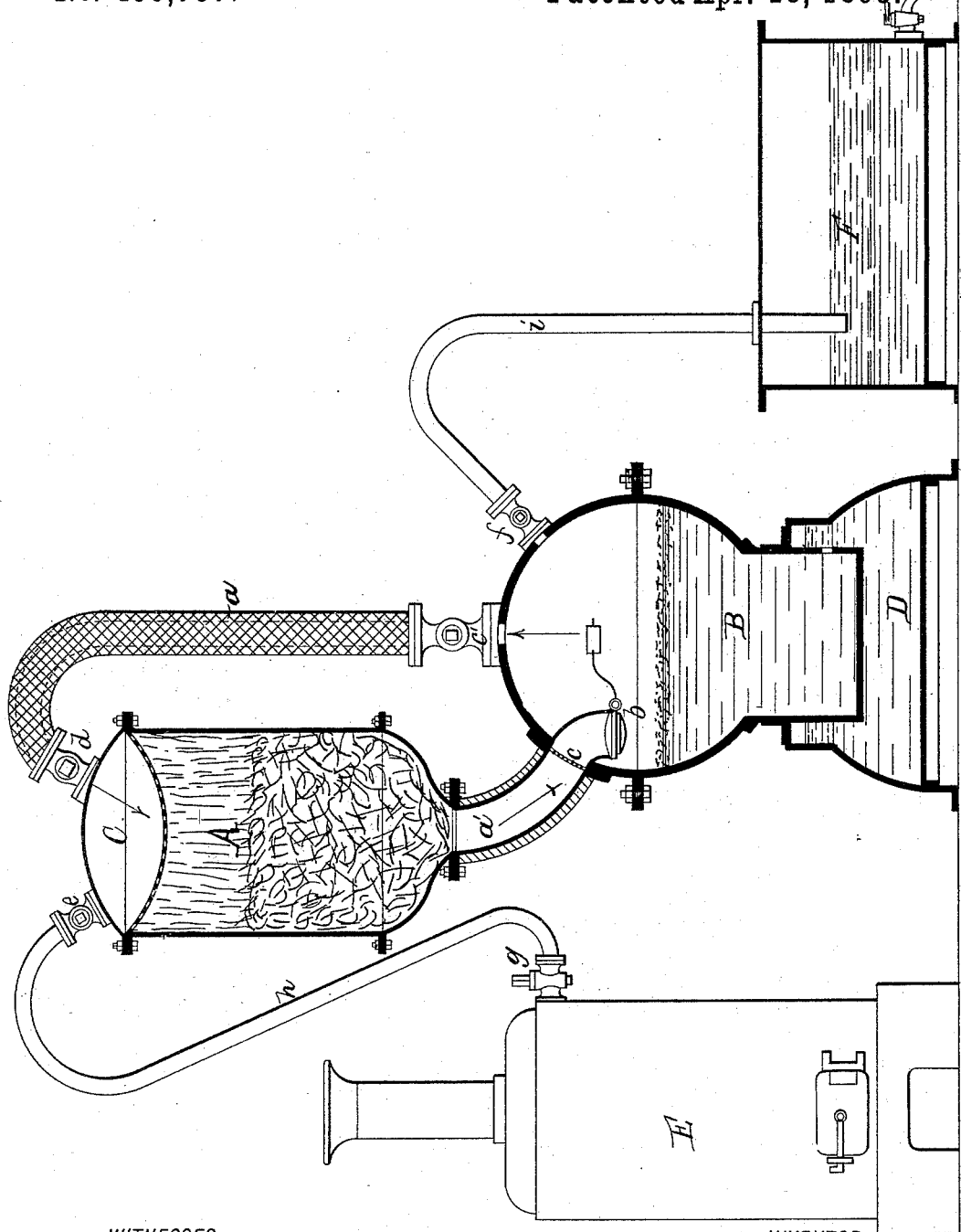
WITNESSES:
George Baumann
Albert Popkins
INVENTOR
Dieudonné Rigole
BY
Howson and Howson
his ATTORNEYS.
THE NORRIS PETERS CO., PHOTO-LITHO., WASHINGTON, D. C.

UNITED STATES PATENT OFFICE.

DIEUDONNÉ RIGOLE, OF SINGAPORE, STRAITS SETTLEMENTS.

PROCESS OF AND APPARATUS FOR THE EXTRACTION OF GUTTA-PERCHA FROM THE LEAVES AND TWIGS OF THE GUTTA-PERCHA TREE.

SPECIFICATION forming part of Letters Patent No. 495,757, dated April 18, 1893.

Application filed August 6, 1892. Serial No. 442,316. (No model.) Patented in England March 3, 1892, No. 4,252.

*To all whom it may concern:*

Be it known that I, DIEUDONNÉ RIGOLE, a citizen of the Republic of France, and residing at Singapore, Straits Settlements, have invented certain Improvements in the Process of and Apparatus for the Extraction of Gutta-Percha from the Leaves and Twigs of the Gutta-Percha Tree, (for which I have obtained a British patent, dated March 3, 1892, No. 4,252,) of which the following is a specification.

This invention relates to a process and apparatus for extracting gutta percha from the leaves and twigs of *isonandras, dichopsis* or other gutta-percha trees by the use of carbon bisulphide. Up to the present time gutta-percha has been extracted from *isonandras, dichopsis*, and other gutta percha trees by the most natural means in default of others, that is to say by cutting down the trees producing the same. Experience has shown that it requires from twenty to twenty five years for a tree of these families to be able to supply a good yield, and that this mode of procedure would lead sooner or later, if not to the total disappearance of these trees, at least to their becoming very rare and would therefore augment to a considerable extent the price of the material.

The importance of the discovery of this improved process and apparatus for extracting gutta percha will be obvious, because instead of the tree being destroyed it obtains, on the contrary, being cut in the proper manner, a greater vitality and every year is obtained a yield exceeding that realized in twenty years by the method which has heretofore been practiced.

In describing this improved process and apparatus by means of which it is carried out I will refer to the accompanying drawing, which shows a side elevation of the apparatus partly in section.

The leaves and twigs, from which the gutta percha is to be extracted are suitably pounded so as to uncover the cells containing the gum. In this state they are introduced into an exhausting vessel A.

The carbon bisulphide, which I employ as a solvent in variable quantities (on an average from twelve to fourteen kilograms for the production of one kilogram of the gutta percha), and which is put in the boiler B, passes through the tube $a$ in a state of vapor into the condenser C where it condenses and then traverses the pounded leaves and twigs. The condensed vapors from the bisulphide containing the soluble principles then return to the boiler B through the tube $a'$, the lower part of which is provided with an automatically operating flap $b$ for permitting the passage of the gum into the boiler B. Across the bore of the tube $a'$ is placed a very thin wire gauze $c$ serving as a filter or rather as a strainer. After the bisulphide has collected a certain portion of the gum, which it conducts to the boiler B where the same is deposited, it escapes through the tube $a$ in order to condense again in the space C and recommence its exhausting operation until the gum contained in the leaves and twigs in the vessel A has been completely extracted. The tubes $a$ and $a'$ are surrounded by a sleeve of cotton, wool or any other non-conducting material which prevents them from cooling. In this manner the carbon bisulphide which is continually being purified by the distillation must in a short time effect the complete exhaustion of the leaves and twigs. Of course the carbon bisulphide contained in the boiler B must never boil, because the gum collected would otherwise become quite oxidated, which inconvenience is obviated by placing the said boiler in a water bath D wherein water is kept at the maximum temperature of 45° centigrade. A steam boiler E is connected to the vessel A by a tube $h$ provided with cocks $e$ and $g$. A tube $i$ provided with a cock $f$ leads from the boiler B to a vessel F. When the exhaustion of the leaves and twigs is complete the valve $c'$ leading from the boiler B to the tube $a$ is closed to prevent the communication of the boiler B with the tube $a$. I also close the cock $d$ which connects the tube $a$ with the vessel A, and open the cocks $e f$ and $g$, and introduce into the vessel A a powerful jet of superheated steam. This steam comes from the boiler E through the tube $h$ and passes into the boiler B through the tube $a'$. It will carry away the few globules of gum which may still be in the leaves and twigs, traverse the tube $a'$ in order to pass to the boiler B containing the gutta percha in solution in the carbon bisulphide, and introduce the vapors through the cock $f$ into the discharge tube $i$ the extremity of which dips a short distance into the water contained in the vessel F. The carbon bisulphide having a greater specific weight than water, falls naturally to the bottom of the vessel F. When the gum has all been extracted from the leaves and twigs the gutta percha is in a liquid state mixed with the solvent. As the steam carries away the carbon bisulphide and precipitates it in the bath F, the gutta percha in the boiler B thickens, and when the last traces of the solvent are removed the gutta percha has become a solid body but capable of being kneaded if put into warm water. In order that no bisulphide shall remain in the gum the introduction of superheated steam may be prolonged in such a manner that the gutta-percha will not be affected by its action and that its oxidation need not be feared.

The complete operation ought not to occupy more than twenty-two to twenty-five minutes for obtaining chemically pure gutta-percha.

Other solvents than carbon-bisulphide would give similar results, such as benzine, chloroform and the like, but the price of these substances which I have tried augments the cost of the gutta percha so much that their employment is not practicable for commercial purposes.

It may be observed that if use is made of benzine as a solvent the gum collected will contain some traces of this substance, the elimination of which presents almost insuperable difficulties.

I claim as my invention—

1. The process of extracting gutta-percha, consisting in passing the condensed vapors of a solvent through a mass of leaves and twigs of a gutta-percha tree, thereby dissolving the gum, carrying away from the mass the mixture of gum and solvent, then subjecting this mixture to a heat sufficient to vaporize the solvent, and then condensing the vapors of the solvent to be again passed through the mass, all substantially as described.

2. The process of extracting gutta-percha consisting in subjecting a mass of leaves and twigs of a gutta-percha-tree to the action of a solvent, then carrying off the mixture of solvent and extracted gum from the said leaves and twigs, and then subjecting such mixture of gum and solvent to the action of steam to separate and carry off the said solvent from the gum.

3. An apparatus for extracting gutta-percha from the leaves and twigs of a gutta-percha tree, comprising a vessel for holding the material to be treated, a boiler for a solvent and means for maintaining a certain temperature in the said boiler in combination with two tubes connecting the said boiler with the said vessel, a steam inlet to the said vessel and a steam outlet from the said boiler, all substantially as and for the purposes set forth.

4. An apparatus for extracting gutta-percha from the leaves and twigs of gutta-percha trees, comprising a boiler B, a vessel A, having an opening at the bottom leading to the boiler B and provided with a steam inlet controlled by a cock $e$ and a valved tube $a$ connecting the top of the boiler B with the top of the vessel A, in combination with a vessel F and a valved pipe connecting the boiler B with the said vessel F, all substantially as and for the purposes set forth.

In testimony whereof I have signed my name to this specification in the presence of two subscribing witnesses.

DIEUDONNÉ RIGOLE.

Witnesses:
DANIEL BRANDT,
MAXIMILIAN JAMES D' LANGE.